(No Model.)

D. B. HOLSBURG.
HARNESS SADDLE.

No. 298,972. Patented May 20, 1884.

WITNESSES:
John H. Deemer
C. Sedgwick

INVENTOR:
D. B. Holsburg
BY
Munn & Co.
ATTORNEYS.

UNITED STATES PATENT OFFICE.

DANIEL B. HOLSBURG, OF GRANVILLE, ILLINOIS.

HARNESS-SADDLE.

SPECIFICATION forming part of Letters Patent No. 298,972, dated May 20, 1884.

Application filed February 20, 1884. (No model.)

*To all whom it may concern:*

Be it known that I, DANIEL B. HOLSBURG, of Granville, in the county of Putnam and State of Illinois, have invented a new and Improved Harness-Saddle, of which the following is a full, clear, and exact description.

The invention consists of the construction, arrangement, and combination of parts, all as hereinafter described and claimed.

Reference is to be had to the accompanying drawings, forming part of this specification, in which similar letters of reference indicate corresponding parts in all the figures.

Figure 1:
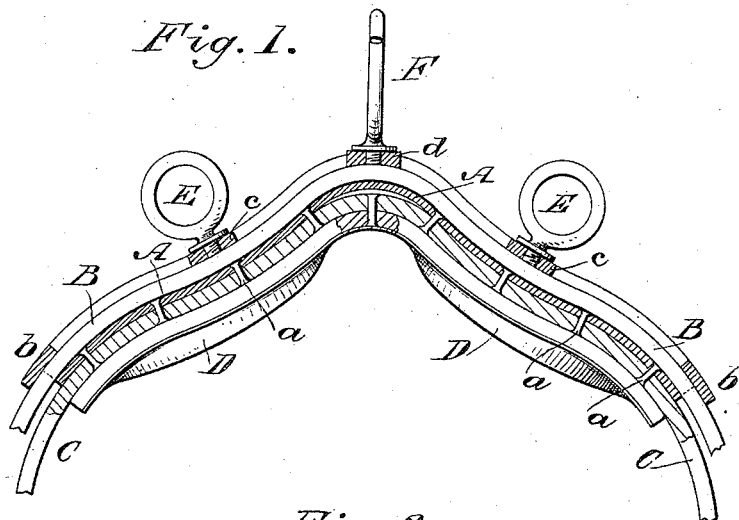
Figure 2:
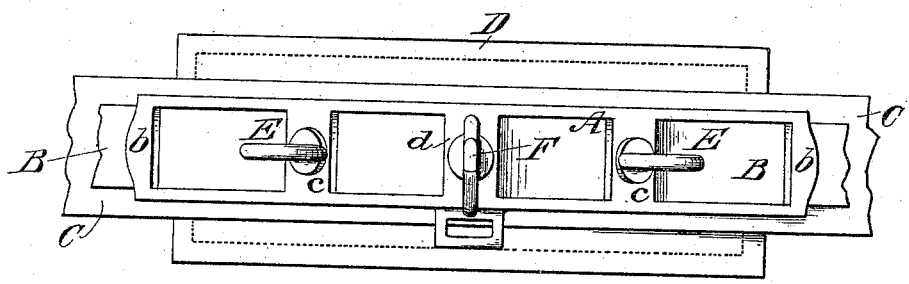
Figure 3:
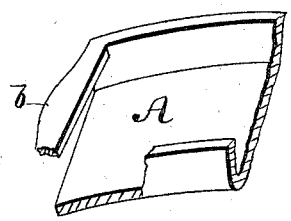

Figure 1 is a longitudinal sectional elevation of my new and improved harness saddle or pad, and Fig. 2 is a plan view of the same. Fig. 3 is an enlarged perspective view of a portion of the channeled tree, with parts broken away.

A represents the tree of the pad or saddle; B, the skirt-strap, which passes entirely over the tree A, and has the thill-loops (not shown) attached to its ends. C represents the main strap of the saddle, which, with suitable extensions, buckles around the horse, and is secured to the tree A by the rivets *a a;* and D represents the pads of the saddle, which are stitched or otherwise secured to the main strap C. The tree A is by preference made of malleable cast-iron and in channel form, and the skirt-strap B passes entirely through the channel thereof, and is not secured to the tree, and the tree is formed by preference with the two lower outer cross-pieces, *b*, which serve as keepers to the strap B, with the two intermediate cross-pieces, *c*, which have the terrets E screwed into them, and with the central bridge or cross-piece, *d*, which receives the check-hook F. The strip B, being independent of the tree and pad, and supporting the thills, receives the movement of the thills, and, being free to move in the tree, takes all of the thill motion, so that there is no side-to-side motion of the pad to chafe or gall the horse's back.

I am aware that a channeled metal frame has been secured within a harness-saddle for the main strap to pass loosely through, and that such a frame has been provided with separately-constructed elastic side plates, which serve to secure the loops for the back-band, and with cross-bars, to which were secured the terrets; and I do not desire to claim, broadly, any such construction as of my invention.

Having thus described my invention, I claim as new and desire to secure by Letters Patent—

1. The combination of the channeled tree A, provided with cross-piece *b c d*, integral therewith, with the strap C and pads D, secured to the under side of the tree by rivets *a* passing through the bottom of the tree, and the strap B passing loosely through the channel, substantially as set forth.

2. As an improved article of manufacture, the tree A, formed in channel shape, and provided at its center with cross-piece *d*, cross-pieces *c c* below the same, and cross-pieces *b* at the ends of the tree, all made in one piece with the tree, whereby supports for the check-hook and terrets and keepers to the main strap are provided, substantially as set forth.

DANIEL B. HOLSBURG.

Witnesses:
J. R. FREEBERN,
J. V. SCHAEFER.